Patented Oct. 17, 1950

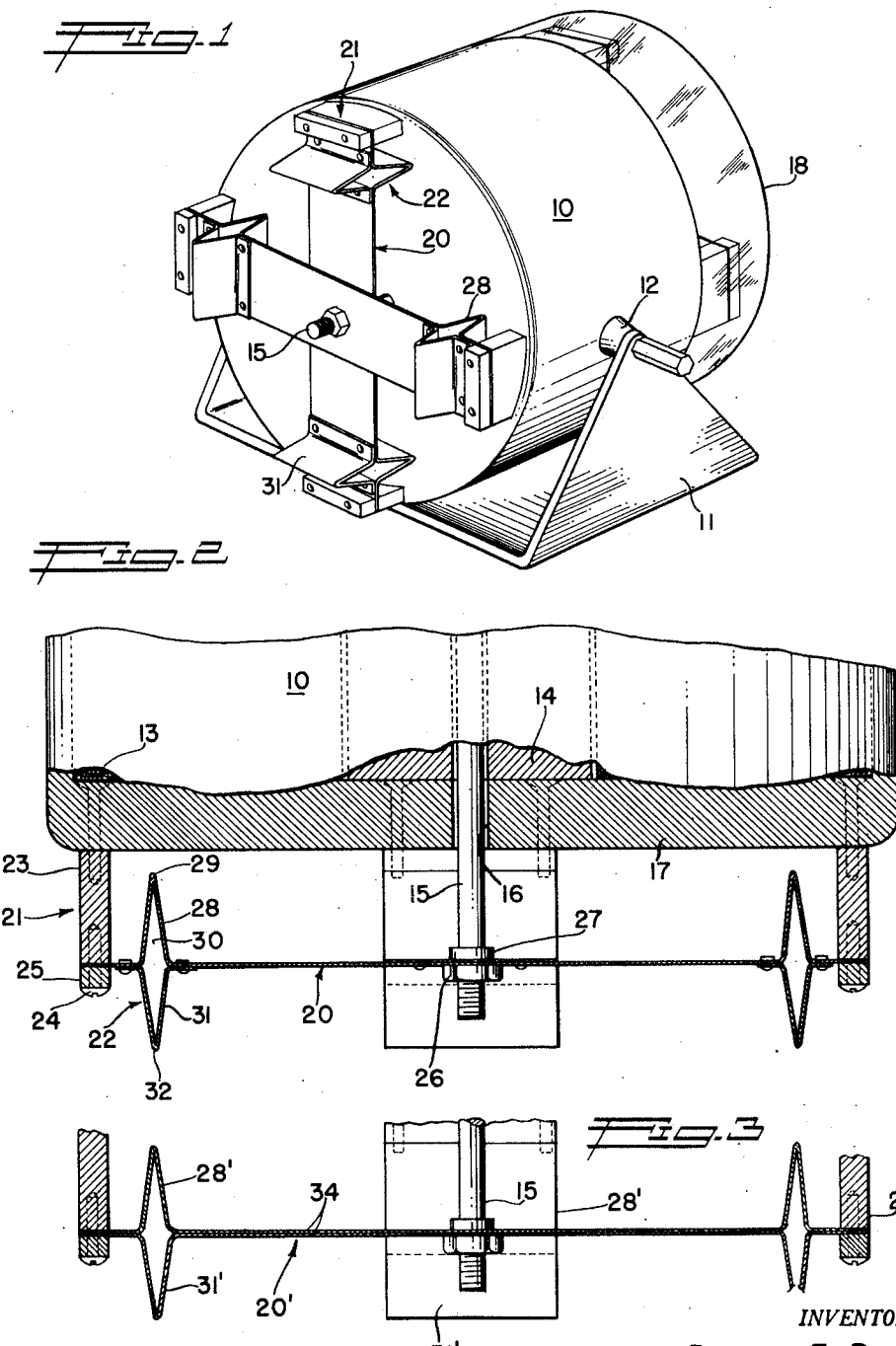

2,526,413

UNITED STATES PATENT OFFICE 2,526,413

SUSPENSION MEANS

Robert E. Rawlins, Van Nuys, Calif., assignor to Lockheed Aircraft Corporation, Burbank Calif.

Application August 3, 1945, Serial No. 608,679

8 Claims. (Cl. 248—358)

1

This invention relates to supporting or mounting devices, and relates more particularly to means for supporting members for translation or movement along an axis.

The present invention, while not confined to any particular field or application, is well suited for embodiment in suspension means for the moving elements of such devices as the so-called dynamic type loud speakers, vibration motors, etc. Accordingly, the invention will be described herein as employed in connection with such devices, it being understood that this is only one typical adaptation and is not to be construed as limiting either the scope or application of the invention.

Difficulty has been encountered in providing suspension means for the moving elements of vibration motors, loud speakers, and the like, which must be capable of true axial movement or translation of large amplitude without displacement in the plane perpendicular to the axis of primary movement, rotation and excessive non-linear restraint. Cantilever, spiral spring suspension means and other similar means and combinations are not entirely satisfactory in such situations because they allow or cause undesired displacement or excessive non-linear restraint of the suspended part when motion of an appreciable amplitude is approached.

It is, therefore, a general object of the present invention to provide simple, practical means for supporting a part for free movement in opposite directions along an axis while preventing displacement in a plane perpendicular to said axis, twisting and rotation. The suspension means allows free motion of the supported part in directions perpendicular to a given plane, and resists motion in all other directions to maintain the supported part for translatory motion only.

Another object of the invention is to provide a suspension means of the character referred to that may comprise one or more simple suspension elements extending between stationary supports and the moving part, and each having an axial compliance allowing free travel of the supported part along a given axis and constructed and arranged to effectively resist movement of the part in all other directions. The axial compliances of the suspension elements, while allowing free translation or reciprocatory motion of sub-

2 stantial amplitude, provide considerable torsional rigidity.

A further object of the invention is to provide a suspension means of the class referred to that is inexpensive to construct and install.

Other objectives and features of the invention will be readily understood from the following detailed description of typical preferred forms of the invention wherein reference will be made to the accompanying drawings in which:

Figure 1 is a perspective view of a vibration motor incorporating suspension means of the invention;

Figure 2 is an enlarged fragmentary horizontal sectional view through the suspension means and adjacent parts; and Figure 3 is a fragmentary view similar to Figure 2 illustrating another form of the invention.

The present invention is concerned with a support or suspension means for translatory members and is adapted for incorporation in apparatus and devices of widely different natures. In the drawings I have shown the invention associated with a vibration motor to carry or suspend its vibration transmitting member. The invention is not primarily concerned with the details of the vibration motor, and it will suffice to say that the motor operates on the principle of the well-known dynamic loud speaker, but has a much wider range of amplitudes and a different range of frequencies, and is capable of producing a driving force of considerable magnitude. Vibration motors of this character are employed in making flutter tests on aircraft structures and components, and in performing similar testing operations.

The vibration motor illustrated comprises a substantially cylindrical case 10 supported on a base 11 by diametrically opposite gimbals 12 so as to be adjustable about a horizontal axis. The case contains the field coils 13, a core 14 of magnetic ingot iron, an armature coil (not shown), suspended in the air gap, and the movable armature rod associated with the coil, and which will hereinafter be termed the member 15. The member 15 passes through an opening 16 in the core 14 and end plate 17 with substantial clearance, and projects beyond the opposite ends of the case 10. The member 15 is threaded at its ends to facilitate connection with the part or structure to be vibrated. Transparent caps or bells 18 may be provided on the ends of the case 10 to protect the suspension means and to keep foreign material out of the aircraft. During operation of the vibration motor, the member 15 is moved or reciprocated through varying strokes and at varying frequencies.

The suspension means of the invention are preferably provided at each end of the case 10 to carry the member 15 for free translation and to resist rotation of the member about a transverse axis. The two suspension means may be identical, and I will proceed with a detailed description of one of them, it being understood that such description is equally applicable to the other means. The suspension means comprises a plurality of flexible supporting elements 20, each extending between a fixed support 21 and the member 15, and each embodying an axial compliance 22.

The suspension elements 20 are preferably in the nature of lengths or strips of thin flexible material such as beryllium copper which has a high resistance to fatigue, it being understood that other suitable materials may be employed. The several suspension elements 20 are preferably of identical length, width and thickness to provide a balanced suspension for the member 15, and its armature coil. In order to obtain the required "softness" or freedom of motion in the direction of armature-coil movement, as provided for by the combination of the members 20 and the compliances 22, the material of the elements 20 and 22 is preferably quite thin; for example, in a typical case, it is .010 inch thick. The thickness of the elements 20 and compliances 22 is exaggerated in the drawings for clarity. The number of suspension elements 20 will vary in different applications of the invention. However, in many applications four elements spaced approximately 90° apart, are found desirable. As illustrated in Figure 1, the elements 20 are rather wide to individually offer substantial resistance movement of the member 15 in a plane perpendicular to the axis of primary movement and other undesired displacement of the member 15, it being understood that the proportions of the elements 20 should be adapted to the particular installation.

The supports 21 for the outer or anchored ends of the suspension elements 20 may comprise blocks 23 of insulating material, or the like, suitably fixed to the end of the case 10. The outer end portions of the elements 20 are flatly engaged on the end faces of the blocks 23 and are secured thereto by screws 24 and cap blocks 25, or other appropriate means. The elements 20 extend radially inward from supporting blocks 23 toward the member 15. As illustrated in the drawings, the elements 20 are related so that their longitudinal axes are equally spaced circumferentially of the assembly and the elements occupy a common plane perpendicular to the axis of the member 15 when the latter is in the rest position. It is to be noted that the rather wide elements 20 effectively inhibit movement of the member 15 in lateral directions, and when the elements are provided in sets of three, four or more in equally spaced relation, all lateral or non-linear movement is prevented.

The several elements 20 may be separately constructed parts fabricated into the suspension assembly or the several elements may be integral parts of a one-piece unit. In Figures 1 and 2, each pair of diametrically opposite elements 20 is formed of a single continuous length of material, and the two strips of material constituting the two pairs of elements cross in face-to-face relation at the center of the assembly. Openings in the crossed parts of the two lengths of material receive the member 15 and a nut 26 is threaded onto the member to clamp the two parts against a shoulder 27 on the member. With this construction or mode of attachment, the member 15 is carried by four equally spaced flexible elements 20 located in a plane perpendicular to the axis of movement of the member.

The axial compliances 22 provide for straight line or true axial movement of the member 15, increase the torsional resistance of the elements 20, and increase the allowable amplitude of movement of the member 15. In the drawings I have illustrated typical forms of axial compliances, it being understood that the compliances may take other configurations. As above described, each element 20 is a continuous length of flexible material extending from its supporting block 23 to its point of connection with the member 15. At a selected point between the ends of each element 20, the band or strip of metal is formed or shaped to have two parts 28 extending therefrom in spaced relation, and integrally joined at their outer ends. These arms or parts 28 extend from their respective elements 20 in the same general direction as the longitudinal axis of the member, but are outwardly convergent to merge along a line of joinder 29. Thus the parts 28 are spaced from one another to leave an outwardly diminishing gap or space 30. It is to be understood that the compliance parts 28 may be flat and of the same width as the elements 20. It is preferred to provide complementary compliance parts 31 for projecting axially from the other side of the respective element 20. In the construction of Figures 1 and 2, separately formed members are riveted or otherwise secured to the elements 20 at the opposite sides of the above mentioned gaps 30, and are generally V-shaped to have axially projecting convergent parts 31 merging at their outer ends along lines of joinder. From an inspection of Figures 1 and 2, it will be seen that the two pairs of compliance parts 28 and 31 of each element 20 form a substantially diamond shaped unit interposed in the element 20 and defining a correspondingly shaped space or gap. This gap preferably approaches a closed condition when the member 15 is in the rest position. While the compliances 28 may be positioned as desired along the lengths of the elements 20, it has been found that the compliances provide greater torsional stability when in spaced adjacent relation to the outer ends of the elements as illustrated. With this positioning of the compliances 22, their outer parts are substantially rigidly anchored.

Figure 3 illustrates another embodiment of the invention in which the suspension elements 20' are each constructed of two laminae 34 of relatively thin flexible material such as beryllium copper, the laminae being shaped or formed to have the oppositely extending compliance arms or parts 28' and 31'. Further, in this construction the laminations 34 are integral and continuous throughout the set of spaced angularly related suspension elements 20'.

It is believed that the action or operation of the suspension means will be readily understood from the foregoing detailed description. With the vibration motor in operation, the member 15 associated with its movable armature-coil, is given reciprocatory motion. The sets of angularly related suspension elements 20 carrying the opposite end portions of the member 15 support the member for free axial movement and introduce negligible friction into the system. As above described, the rather wide elements 20, lying in planes perpendicular to the direction of axial movement, effectively prevent radial displacement and angular movement of the member. The compliances 22 assist materially in preventing such displacement and impart a substantial degree of torsional resistance to the individual elements 20 to prevent twisting of the same. During the axial movement of the member 15 in opposite directions, the compliances 22 "breath"; that is, their parts 22 and 31 move toward and away from one another, and the gaps 30 increase and decrease in width simultaneously with the inward and outward movement of the member. This "breathing" action of the compliances allows a considerably greater range of axial motion or reciprocation of the vibratory member 15 than is obtainable with other forms of suspension means per unit of restraint and per unit length of the suspension elements. The improved suspension means of the invention is capable of adequately supporting a substantial load.

Having described only typical forms of the invention, I do not wish to be limited to the specific details herein set forth, but wish to reserve to myself any variations or modifications that may appear to those skilled in the art or fall within the scope of the following claims.

I claim:

1. Means for supporting a member for movement in opposite directions along a given axis comprising a plurality of thin flexible strap-like suspension elements extending radially with respect to said axis and equally spaced circumferentially thereabout, the elements being arranged with their transverse axes in a common plane substantially perpendicular to the first named axis, means for connecting the member with the suspension elements, means for securing the outer ends of the suspension elements, and axial compliances intermediate the ends of the suspension elements.

2. Means for supporting a member for movement in opposite directions along a given axis comprising at least one flexible strap-like element lying in a plane substantially normal to said axis, means for maintaining the element in supporting association with the member, means at a point spaced axially of the member from the first named means for supporting the element, and an axial compliance spaced between the first and second named means, said compliance including two spaced adjacent parts of the element extending from a face of the same and connected at their outer ends.

3. Means for supporting a member for movement in opposite directions along a given axis comprising a plurality of thin flexible strap-like suspension elements extending radially with respect to said axis, the elements being arranged with their broad faces in a common plane perpendicular to said axis, means for maintaining the elements in supporting relation to the member, means for mounting the outer ends of the elements, and an axial compliance in each element at a point between the two said means including two spaced adjacent parts projecting from a broad face of the element in convergent relation and joined at their outer ends, the elements being discontinuous at the compliances except for the joinder of said parts.

4. Means for supporting a member for movement in opposite directions along a given axis comprising a plurality of thin flexible strap-like suspension elements extending radially with respect to said axis, the elements being arranged with their broad faces in a common plane perpendicular to said axis, means for maintaining the elements in supporting relation to the member, means for mounting the outer ends of the elements, and an axial compliance in each element including two spaced adjacent parts projecting from a broad face of the element in convergent relation and joined at their outer ends, the elements being discontinuous at the compliances except for the joinder of said parts, the compliances being in spaced adjacent relation to the outer ends of the elements.

5. Means for supporting a member for movement in opposite directions along a given axis comprising a plurality of thin flexible strap-like suspension elements extending radially with respect to said axis, the elements being arranged with their broad faces in a common plane perpendicular to said axis, means for maintaining the elements in supporting relation to the member, means for mounting the outer ends of the elements, and an axial compliance in each element including two spaced adjacent parts projecting from each broad face of the element in convergent relation and being integrally joined together at their outer ends.

6. Means for supporting a member for movement in opposite directions along a given axis comprising a plurality of thin flexible strap-like suspension elements extending radially with respect to said axis, the elements being arranged with their broad faces in a common plane perpendicular to said axis, means for maintaining the elements in supporting relation to the member, means for mounting the outer ends of the elements, and an axial compliance in each element including two spaced adjacent parts projecting from each broad face of the element in the same general direction as said axis and joined at their outer ends, the parts at the opposite faces of each element being in substantial alignment and the elements being discontinuous at the compliances except for the joinder of said parts.

7. Means for supporting a member for movement on a given axis comprising a plurality of thin flexible supporting elements of substantial width extending substantially radially with respect to said axis, means for maintaining the elements in supporting association with the member, means supporting the outer ends of the elements, said elements being arranged with their broad faces in a common plane substantially perpendicular to said axis so that the elements offer substantial resistance to lateral displacement of the member, each element including an axial compliance characterized by two spaced adjacent portions of the element projecting from one broad face thereof in converging relation and integrally joined together at their extremities.

8. Means for supporting a member for movement on a given axis comprising a plurality of thin flexible supporting elements of substantial width extending substantially radially with respect to said axis, means for maintaining the elements in supporting association with the member, means supporting the outer ends of the elements, said elements being arranged with their broad faces in a common plane substantially perpendicular to said axis so that the elements offer substantial resistance to lateral displacement of the member, each element including an axial compliance characterized by two spaced adjacent portions of the element projecting from one broad face thereof in converging relation and integrally joined together at their extremities, and a section secured to the other broad face of the element and having two portions projecting from said other face in convergent relation and integrally joined together at their extremities.

ROBERT E. RAWLINS.

REFERENCES CITED

The following references are of record in the file of this patent:

UNITED STATES PATENTS

| Number | Name | Date |
|---|---|---|
| 1,782,437 | Moskowitz | Nov. 25, 1930 |
| 1,817,091 | Miller | Aug. 4, 1931 |

FOREIGN PATENTS

| Number | Country | Date |
|---|---|---|
| 755,513 | France | Nov. 25, 1933 |